United States Patent
Lipton et al.

(10) Patent No.: US 7,517,081 B2
(45) Date of Patent: Apr. 14, 2009

(54) LOW-COST CIRCULAR POLARIZING EYEWEAR

(75) Inventors: Lenny Lipton, Los Angeles, CA (US); Rod Archer, Danville, CA (US)

(73) Assignee: Real D, Beverly Hills, CA (US)

( * ) Notice: Subject to any disclaimer, the term of this patent is extended or adjusted under 35 U.S.C. 154(b) by 308 days.

(21) Appl. No.: 11/491,001

(22) Filed: Jul. 20, 2006

(65) Prior Publication Data

US 2008/0018851 A1     Jan. 24, 2008

(51) Int. Cl.
    *G02C 7/12*    (2006.01)
(52) U.S. Cl. ........................................ 351/49
(58) Field of Classification Search .................. 351/49, 351/44, 158, 41, 159, 177, 47, 57; 2/12, 2/13, 426, 434
    See application file for complete search history.

(56) References Cited

U.S. PATENT DOCUMENTS 2,005,426 A * 6/1935 Land ........................... 351/49
2,099,694 A    11/1937 Land
2,719,565 A * 10/1955 Wolff .......................... 156/176
4,792,850 A    12/1988 Lipton et al.
4,943,152 A *  7/1990 Whelen ........................ 351/49

OTHER PUBLICATIONS

International search report and written opinion of international searching authority for co-pending PCT application No. PCT/US2007/015960 mailed Jan. 15, 2009.

* cited by examiner

*Primary Examiner*—Hung X Dang
(74) *Attorney, Agent, or Firm*—Baker & McKenzie LLP

(57) ABSTRACT

A method and system of providing circularly polarized eyewear is provided. The eyewear comprises substantially rigid material configured to maintain lensing material, such as card stock or plastic. The lensing material comprises polarizing lensing material located proximate the substantially rigid material, and retarder lensing material matched to the polarizing lensing material. The retarder lensing material is positioned adjacent to the polarizing lensing material such that each eye of a user sees an intended image, and an unintended image is blocked thereby when used in conjunction with suitably polarization encoded projected images. The polarizing lensing material and retarder lensing material are fixedly maintained in association with the substantially rigid material and are configured to be provided free of lamination.

20 Claims, 2 Drawing Sheets

LOW-COST CIRCULAR POLARIZING EYEWEAR

BACKGROUND OF THE INVENTION

1. Field of the Invention

The present design relates generally to the art of circular polarizing eyewear, and more specifically to enhanced techniques for cardboard, paper, plastic-framed or other kinds of eyewear that can lower the cost of providing circular polarizing eyewear for viewing projected stereoscopic motion pictures and maintaining the highest image quality.

2. Description of the Related Art

Circular polarized light for image selection has been the subject of several prior disclosures. Reference is made to the work of Land, U.S. Pat. No. 2,099,694, and Walworth in the proceedings of the SPIE, Vol. 462, Optics in Entertainment, "Three-Dimensional projection with Circular Polarizers." Certain companies, including REAL D, the assignee of the present invention, project or release stereoscopic motion pictures in the theatrical cinema using circular polarization for image selection. Previously, for the most part, linear polarization has been used for image selection and not circular polarization. Part of the reason for this lack of acceptance has been the high cost of circular sheet polarizer materials compared with the more widely used linear sheet polarizer.

Stereoscopic movies using polarization employ one of two projection methods. The first uses two projectors, either digital or film projectors, with plastic sheet polarizers in front of the lens of each projector. Such an arrangement projects onto a so-called "silver screen," actually a screen that has been coated with aluminum pigment or paint to conserve polarization. The second is gaining in popularity and uses a single digital projector for the field-sequential approach for projecting stereoscopic movies as described by Lipton et al in U.S. Pat. No. 4,792,850, and first manufactured by StereoGraphics Corp. and further described by Lipton in "The Stereoscopic Cinema: From Film to Digital Projection," *SMPTE Journal*, September 2001. For either the single or dual projector method, a "silver screen" is employed and audience members wear eyewear having sheet polarizing filters.

A major commercial problem with regard to circular polarizing material has to do with cost rather than performance. A circular polarizer comprises a linear polarizer and a quarter-wave retarder. These materials are often made in different factories, and this means that a manufacturer of circular polarizer may purchase the raw lens materials from two factories, both receiving a profit for producing the individual items. The manufacturer of the circular polarizer, who combines or laminates the polarizer and retarder sheets, also profits for the construction of each device. In some cases the device passes through a supplier or reseller, so there are many entities deriving profits from the sale of such devices, increasing the overall cost of the circular polarizer materials.

Linear polarizers cost considerably less than circular polarizers and find favor with many exhibitors for this reason alone. However, performance of linear polarizers is inferior for various reasons, including the Law of Malus, discussed below. One virtue of using the linear polarization scheme for image selection is that it is possible to deploy inexpensive eyewear that can be disposed after a single use. Alternatively, exhibitors such as theme parks often use plastic-framed eyewear that can be cleaned and reused. In most circumstances, theme parks have the infrastructure and financial capability to recycle eyewear but theatrical cinema exhibitors do not. Therefore, some type of high performance and low cost disposable eyewear for use in neighborhood cinemas and multiplexes is desirable. Moreover, recycled eyewear frequently become warped and scratched after on several cleanings.

Circularly polarized low cost eyewear has previously employed sheets of polarizing and retarder materials laminated together. However, the costs involved include obtaining the polarizer material, obtaining the retarder material, laminating the polarizer material with the retarder material, and including the laminated polarizer and retarder material in the finished eyewear. Each of these steps or processes takes time and money to complete.

In addition, the business model that is used for theatrical release requires that the exhibitors charge as much as twice the studio's cost of the eyewear for the studio to recover its costs. Therefore, in order to encourage the distribution of stereoscopic movies, a lowest overall production cost for eyewear is mandatory.

Eyewear designs having relatively low manufacturing and distribution costs that enable high quality image viewing in both single and dual projector methods can provide significant advantages over eyewear designs previously made available. Such eyewear designs could provide the ability for theater owners to effectively and efficiently provide eyewear to audiences for enhanced viewing experiences as compared against eyewear previously available.

SUMMARY OF THE INVENTION

According to one aspect of the present design, there is provided circularly polarized eyewear that comprises substantially rigid material configured to maintain lensing material. The lensing material comprises polarizing lensing material located proximate the substantially rigid material, and retarder lensing material matched to the polarizing lensing material. The retarder lensing material is positioned adjacent to the polarizing lensing material such that each eye of a user sees an intended image, and an unintended image is blocked thereby when used in conjunction with suitably polarization encoded projected images. The polarizing lensing material and retarder lensing material are fixedly maintained in association with the substantially rigid material and are configured to be free of lamination.

These and other advantages of the present invention will become apparent to those skilled in the art from the following detailed description of the invention and the accompanying drawings.

DETAILED DESCRIPTION OF THE INVENTION

The present design does not use laminating of the retarder and polarizer, but instead merely employs the retarder and polarizer lensing materials in the stock or frames of the eyewear, thereby providing circularly polarized lenses in low cost eyewear that does not require lamination of the materials.

Previously available low cost eyewear typically employed linear polarizers, but such designs are not optimal for viewing stereoscopic images. When image selection uses linearly polarized light the Law of Malus applies. The Law of Malus relates the intensity I of linearly polarized light transmitted by a linear polarizer to both the intensity $I_0$, of the incident linear polarized light and the angle B between the axis of incident polarized light and the axis of the analyzer. The relationship between these quantities is shown in Equation (1):

$$I = I_0 * \cos^2(B) \tag{1}$$

A small change in the angle B therefore results in a large change in transmission intensity. As a result, a small amount of head tipping can lead to the loss of the stereoscopic effect when using linear polarizing eyewear to view a 3-D or stereoscopic movie. Only a little bit of head tipping—just a few degrees—results in crosstalk or in some situations a double image. Asking people to hold their heads rigidly and in one position for a feature-length film is undesirable. Such an unwavering posture may be acceptable for short films, such as those shown in theme parks or other location-based entertainment venues.

Figure 1:
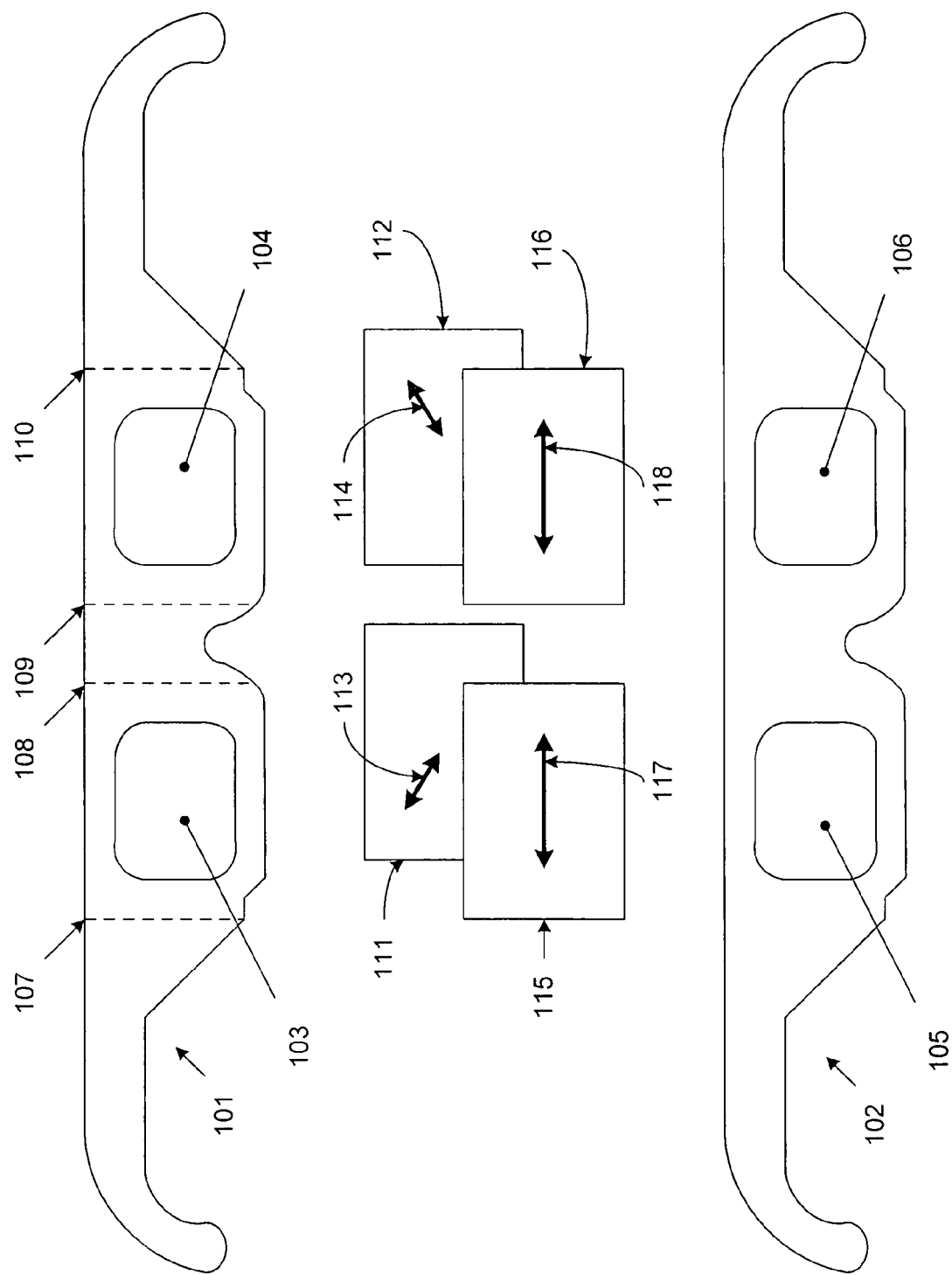
FIG. 1 illustrates the circularly polarizing low cost eyewear.

FIG. 1 illustrates the two halves of a frame for stereoscopic eyewear. The halves are typically made of the same material that in all likelihood is either paper (or card stock) or plastic. However, this design is not limited to particular materials for the frame. There may be special assembly considerations dependent upon the frame materials, such as the method for joining the front and back and the manner in which the sheets of polarizing and retarder film are assembled that would be better served by alternate materials, and such alternate materials may be employed while still within the scope of the present design.

Part 101 represents the front of the eyewear, or the part of the product that will face the theater screen. Part 102 represents the half of the eyewear that will face the user's eyes. For part 101, the part exposed is the inside surface. For part 102, the part exposed is the outside surface. Paper and plastic framed eyewear will be considered in turn, but the process described for one can generally be employed for the other.

In general, sheets of stock, such as cardboard or card stock, are glued or otherwise affixed together with appropriate lensing material disposed therebetween. The eyewear may be cut from stock so fashioned. As may be appreciated, lensing material is disposed between the stock and may be glued to the stock but not at points where the lenses in the eyewear are actually exposed or in front of the eyes. In other words, the glue or adhesive is not attached to the lensing at a point or points where the user looks through the lenses. The optical portions, i.e. the lenses, require relatively precision cutting and removal of stock to expose the lensing material when fashioning the eyewear. The eyewear may employ stock having pre-cut holes where strips or small pieces of lensing material are inlaid and edge-glued within the stock and the eyewear cut with the lensing material exposed.

Thus sheets of card stock or other material that will eventually be employed as eyewear typically have front and rear stock die cut for lens windows. The stock can be made of paper or plastic, but in the present discussion the stock will be described in the context of paper for simplification. Long strips of lens or filter material are laid on top of the front sheet of stock that eventually forms part 101 in FIG. 1. The rear sheet is then glued on top of the front sheet, thereby capturing the filters. The sandwiched ensemble is then die cut to form the final eyewear according to the desired shape of the frames, such as the shape illustrated in FIG. 1.

The two large sheets of paper or cardboard stock are therefore glued together or affixed together by conventional means, such as adhesive, to capture the lenses (sometimes called filters, and in this case polarizers and retarders). Prior to this step, windows or openings 103 and 104 may have been die cut out of front stock or part 101 and windows or openings 105 and 106 have been cut out of rear stock or part 102. The filters, typically disposed in long rectangular strips, are added between the two pieces of paper stock, before they have been once again die-cut to the shape of the frame. Long sheets of filters typically the width of 107 (dotted lines) to 108 (dotted lines) may be laid down on the inside surface of part 101. Similarly, long sheets of filters the width of 109 (dotted lines) to 110 (dotted lines) may be laid down on the inside surface of part 101. The front and rear halves of stock or part 101 and part 102 are brought together and glued, capturing the filters between them. In this case, as described more fully below, the two-filter ensemble 111, 113 and/or 112, 114 forms a circular polarizer.

Thus two sheets of film, linear polarizer 115, 116 and retarder 111, 112, are not laminated together, as is the custom, but are instead held or disposed together without lamination. In the case of paper or card stock frames the eyewear components of FIG. 1 are shown in their unfolded state. There are usually scored lines embossed in the eyewear so that the temples can be formed to fit along the sides of the head and over the ears. Front piece or part 101 has openings for lenses 103 and 104 which are the left and right lenses, respectively. Areas delineated between, for example, line 107 and opening 103 and also between line 109 and opening 104 show where the inserted filters 111, 115, and 112, 116 are positioned. Lenses or lens material are located between die cut lens openings 103-105 and 104-106. When looking at part 101 in FIG. 1, the backside or inside of the front assembly section of the paper or cardstock eyewear is shown. Part 102 is seen from the side of the eyewear that is eventually immediately adjacent to the user's eyes.

The present design avoids the need to laminate the linear polarizer and retarder components of the circular polarizers. Left- and right-handed circular polarizers are made up of a retarder and linear polarizer materials laminated together. In the present design, this lamination process is avoided. Circular polarizers are made up of a linear polarizer and a quarter-wave retarder. In FIG. 1 linear polarizer 115 is shown with axis 117, and linear polarizer 115 is used in conjunction with retarder 111 whose axis is 113. Similarly, for the right-eye perspective view, the linear polarizer 116 having axis 118 is used in combination with retarder 112 having axis 114.

The axis of a quarter-wave retarder is at 45 degrees to the linear polarizer axis. There are two possibilities for this 45-degree orientation illustrated in FIG. 1. In one case the axis is rotated at 45 degrees to the right (clockwise or at 45 degrees from vertical), as shown at 114, and in the other case it is rotated at 45 degrees to the left (counterclockwise or at −45 degrees from vertical). In one case we get circular polarized light of one handedness, for example left, and in the other case circular polarized light that is of right-handedness. Having each eye's polarizer and the retarder properly oriented, namely oriented with differing axes such as the +45 and −45 degree rotation shown in FIG. 1 creates circular polarizing filters of opposite handedness. The purpose of the eyewear analyzers is to pass projected circularly polarized light of one handedness while blocking light of the other. In this way each eye sees its intended image and the unintended image is blocked. The retarder is preferably closest to the screen and the polarizer closest to the eyes of the user in order for the circular polarization scheme to work properly.

In the drawing of FIG. 1, the axes of the linear polarizers are parallel, which is the approach used in combination with the push-pull modulator used in the projection system offered by REAL D, such as the system described in U.S. Pat. No. 4,792,850, which is hereby incorporated by reference. However, in some systems, such as the Polaroid II product, the linear polarizer axes are orthogonal. In fact, the linear polarizer component of the circular polarizer can be at any orientation as long as the retarder is properly associated with the linear polarizer and forms either a 45-degree or a negative 45-degree angle. The linear polarizer component of the projector circular polarizer (for the proper perspective view) must be orthogonal to the linear polarizer component of the circular polarizing analyzer in the eyewear for the best dynamic range and the least amount of cross talk.

The eyewear may alternately have right handed circular polarizers used for the right eyes and the left for the left eyes, and vice versa, so long as the system has been designed consistently so that the appropriate eye sees its appropriate image and not vice versa. In such a design, there is no loss of generality with regard to these specifications insofar as such alterations of handedness or orientation of linear polarizer components are concerned. In other words, as long as the eyewear operates with polarizers and retarders such that each eye sees its intended image and the unintended image is blocked, a combination of polarizers and retarders may be employed.

The retarder and the polarizer are not laminated but rather are captured between the front and the rear portions of the eyewear. The two component sheet films are captured and held in place using the ordinary assembly techniques for paper stock or plastic, or for other eyewear materials. The two layers of film (retarder and polarizer) are held in place and captured to form a circular polarizer. The retarder, for example, may be glued to the front piece or part 101 and the polarizer glued to the back piece or part 102. This obviates the requirement for lamination, and eliminates the costs associated with lamination or fixed joining of the lensing materials, lowering the overall assembly cost for the finished eyewear.

One variation on the paper eyewear fabrication process is to use three sheets of card stock and to capture the retarder between two sheets or components (components one and two) and then to capture the polarizer between the second component and a third component. All five components, namely sheet one, retarder, sheet two, polarizer, and sheet three are positioned together and typically the sheets are glued together or otherwise affixed. This results in a slightly thicker arrangement, but separates the lensing material and can be used successfully to produce the eyewear.

Other materials may be employed, where such materials are typically substantially rigid, wherein substantially rigid material includes cardboard or paper stock which can be somewhat flexible, as well as other materials, including but not limited to plastic. The fabrication of plastic framed eyewear differs only insofar as that for plastic the frames, namely front piece or part 101 and rear piece or part 102, are preformed and not formed after the front and rear frame halves are assembled around or with the lensing material. Front and rear plastic frames typically have lens openings 103, 105 and 104, 106 that have the circular polarizer components 111, 115 and 112, 116 inserted therein. The plastic pieces or frames are then brought together and glued, screwed, welded, or otherwise affixed into place thereby capturing the unlaminated retarder and linear polarizer sheets. The filter/lensing materials are typically pre-cut to shape for the plastic lenses and are fitted into the lenses and fixedly mounted therein.

The present design therefore provides circular polarizing stereoscopic eyewear using a technique in which no lamination is required for the constituent components of the circular polarizer material, but which rather takes advantage of present assembly techniques of paper or plastic eyewear, and uses them to maximum advantage in order to reduce the cost of producing the goods. By capturing the retarder or quarter-wave film together with the linear polarizer, advantage is taken of the frame assembly procedure to combine the circular polarizer elements without requiring the added cost of lamination of the constituent sheet filter elements.

Figure 2:
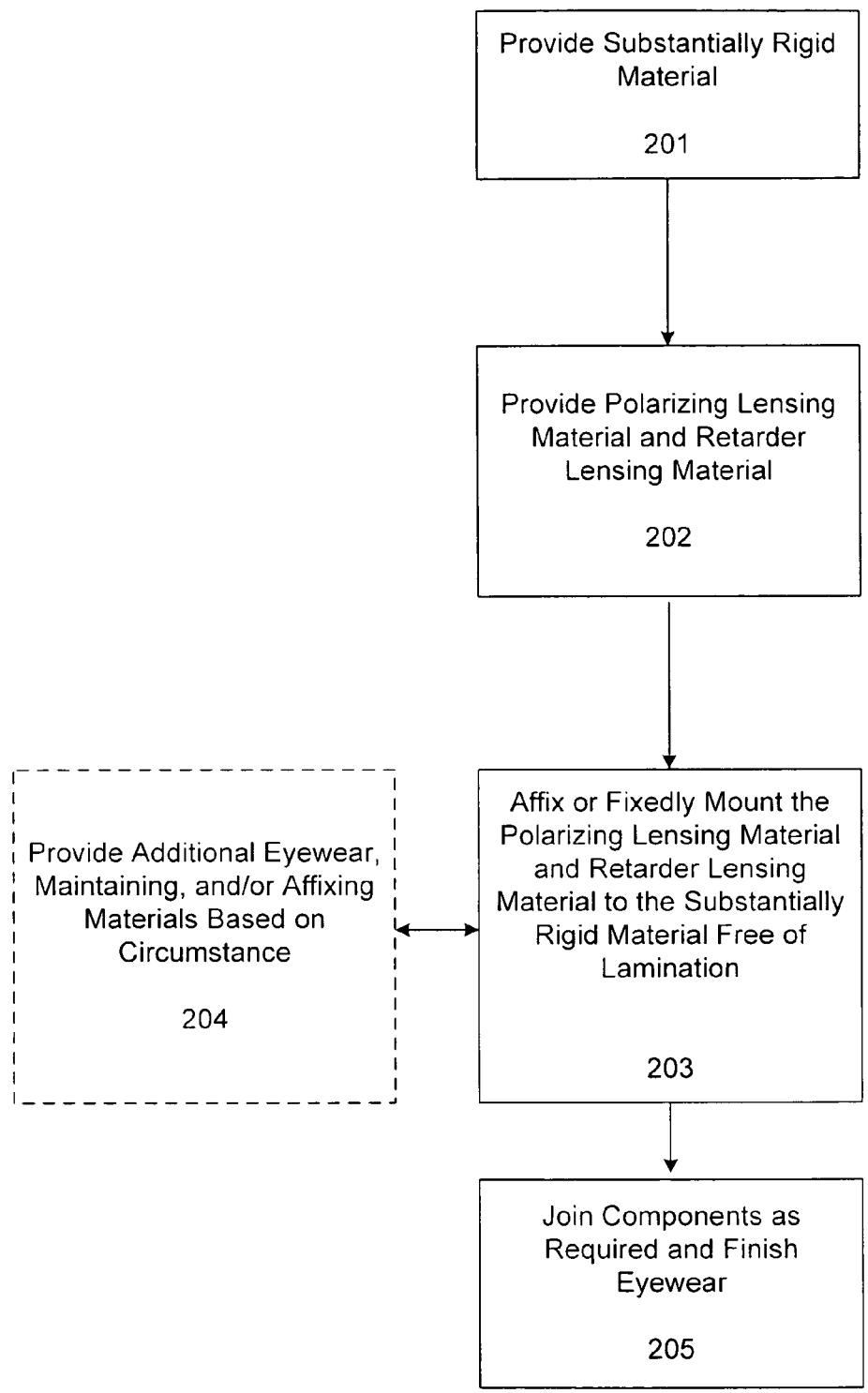
FIG. 2 is a flow diagram for producing circularly polarized and low cost eyewear.

FIG. 2 illustrates a general process flow diagram for the current design. From FIG. 2, the design first calls for providing substantially rigid material, such as a stock formed of either cardboard or paper, either solid or pre-cut, or plastic or another reasonable material appropriate for the circumstances, at point 201. At point 202, the polarizing material and the retarder material may be disposed within the stock, such as strips of polarizer material and strips of retarder material placed within the stock, or circles or other precut pieces being placed within the openings of the stock, where stock may be any material including but not limited to paper and plastic. As discussed herein, the polarizer and retarder materials are of a specific construct, namely having the orientations such as shown in FIG. 1 or some other orientation such that each eye sees its intended image and the unintended image is blocked.

At point 203, the polarizer and retarder materials are affixed to the stock or frames in the manner discussed herein. For example, the stock being paper or cardboard, the polarizer may be affixed to one side of the stock, such as by gluing, while the retarder strips or lens portions may be affixed to the other side of the stock. As an alternative, as shown at point 204, additional materials may be provided, either before, during, or after the affixing of point 203, such as placing an additional piece of stock between the retarder material and the polarizer material, or added materials such as plastic frames having mounting devices located thereon for purposes of receiving and maintaining or holding the lensing materials. Other materials may be added as reflected by point 204 depending on the circumstances encountered and the desires of the manufacturer. At point 205, the eyewear is joined and finished, whether by gluing or otherwise affixing front and rear stock together and/or cutting stock or locking plastic frames together using screws, etc. The result is a completely formed set of low cost eyewear that eliminates the need for laminating polarizer and retarder materials.

The devices, processes and features described herein are not exclusive of other devices, processes and features, and variations and additions may be implemented in accordance with the particular objectives to be achieved. For example, devices and processes as described herein may be integrated or interoperable with other devices and processes not described herein to provide further combinations of features, to operate concurrently within the same devices, or to serve other purposes. Thus it should be understood that the embodiments illustrated in the figures and described above are offered by way of example only. The invention is not limited to a particular embodiment, but extends to various modifications, combinations, and permutations that fall within the scope of the claims and their equivalents.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A set of circularly polarized eyewear comprising:
   substantially rigid material configured to maintain lensing material;
   polarizing lensing material located proximate the substantially rigid material; and
   retarder lensing material matched to the polarizing lensing material and positioned adjacent to the polarizing lensing material such that each eye of a user sees an intended image, and an unintended image is blocked thereby when used in conjunction with suitably polarization encoded projected images;
   wherein the polarizing lensing material and retarder lensing material are fixedly maintained in association with the substantially rigid material and are configured to be provided free of lamination.

2. The eyewear of claim 1, wherein the substantially rigid material comprises stock formed from at least one from a group comprising paper and cardboard, and wherein the substantially rigid material comprises two substantially matched pieces.

3. The eyewear of claim 2, wherein the polarizer lensing material is fixedly mounted to a first matched piece and the retarder lensing material is fixedly mounted to a second matched piece.

4. The eyewear of claim 3, further comprising additional material interposed between the polarizer lensing material and the retarder lensing material.

5. The eyewear of claim 3, wherein polarizing lensing material and retarder lensing material are fixedly mounted to the substantially rigid material using adhesive.

6. The eyewear of claim 1, wherein the substantially rigid material is formed from plastic.

7. The eyewear of claim 1, wherein polarizing lensing material comprises a plurality of polarized pieces and each polarized piece is provided in a first polarization orientation, and retarder lensing material comprises a plurality of retarder pieces each oriented in a different orientation from each other and from the first polarization orientation.

8. A method for constructing circularly polarized eyewear comprising:
   providing substantially rigid material; and
   providing polarizing lensing material with retarder lensing material free of lamination by fixedly maintaining the polarizing lensing material and the retarder lensing material in association with said substantially rigid material;
   wherein said polarizing lensing material and said retarder lensing material enable each eye of a user to receive an intended image and an unintended image is blocked when used in conjunction with suitably polarization encoded projected images.

9. The method of claim 8, wherein the substantially rigid material comprises stock formed from at least one from a group comprising paper and cardboard, and wherein the substantially rigid material comprises two substantially matched pieces.

10. The method of claim 9, wherein providing lensing material comprises:
    fixedly mounting the polarizing lensing material to a first matched piece; and
    fixedly mounting the retarder lensing material to a second matched piece.

11. The method of claim 10, further comprising providing additional material between the polarizer lensing material and the retarder lensing material.

12. The method of claim 10, wherein polarizing lensing material and retarder lensing material are fixedly mounted to the substantially rigid material using adhesive.

13. The method of claim 8, wherein the substantially rigid material is formed from plastic.

14. The method of claim 8, wherein polarizing lensing material comprises a plurality of polarized pieces and each polarized piece is provided in a first polarization orientation, and retarder lensing material comprises a plurality of retarder pieces each oriented in a different orientation from each other and from the first polarization orientation.

15. An apparatus comprising:
    substantially rigid material configured to receive and maintain lensing material;
    polarizing lensing material located proximate the substantially rigid material; and
    retarder lensing material matched to the polarizing lensing material and positioned adjacent to the polarizing lensing material;
    wherein the polarizing lensing material and retarder lensing material are fixedly maintained in association with the substantially rigid material and are configured to be provided free of lamination to form circular polarizing eyewear.

16. The apparatus of claim 15, wherein the substantially rigid material comprises stock formed from at least one from a group comprising paper and cardboard, and wherein the substantially rigid material comprises two substantially matched pieces.

17. The apparatus of claim 16, wherein the polarizer lensing material is fixedly mounted to a first matched piece and the retarder lensing material is fixedly mounted to a second matched piece.

18. The apparatus of claim 17, further comprising additional material interposed between the polarizer lensing material and the retarder lensing material.

19. The apparatus of claim 15, wherein the substantially rigid material is formed from plastic.

20. The apparatus of claim 15, wherein polarizing lensing material comprises a plurality of polarized pieces and each polarized piece is provided in a first polarization orientation, and retarder lensing material comprises a plurality of retarder pieces each oriented in a different orientation from each other and from the first polarization orientation.

* * * * *